United States Patent
Lee et al.

(10) Patent No.: US 8,459,240 B2
(45) Date of Patent: Jun. 11, 2013

(54) CANISTER FOR VEHICLES AND FUEL SUPPLY SYSTEM PROVIDED WITH THE SAME

(75) Inventors: Sungwon Lee, Hwaseong-si (KR); Jung Soo Park, Seoul (KR); Ju Tae Song, Suwon-si (KR); Won Kyu Choi, Gunpo-si (KR)

(73) Assignees: Hyundai Motor Company, Seoul (KR); Kia Motors Corporation, Seoul (KR)

( * ) Notice: Subject to any disclaimer, the term of this patent is extended or adjusted under 35 U.S.C. 154(b) by 394 days.

(21) Appl. No.: 12/958,032

(22) Filed: Dec. 1, 2010

(65) Prior Publication Data
US 2012/0073549 A1    Mar. 29, 2012

(30) Foreign Application Priority Data
Sep. 29, 2010   (KR) .................. 10-2010-0094724

(51) Int. Cl.
*F02M 25/08*    (2006.01)
(52) U.S. Cl.
USPC ............ 123/519; 123/518; 123/520; 123/521
(58) Field of Classification Search
USPC .......... 123/516, 518, 519, 520, 698; 137/587, 137/588, 589
See application file for complete search history.

(56) References Cited

U.S. PATENT DOCUMENTS

| | | | | |
|---|---|---|---|---|
| 5,635,630 A * | 6/1997 | Dawson et al. | ............ | 73/40.5 R |
| 5,878,729 A * | 3/1999 | Covert et al. | ................. | 123/520 |
| 6,499,472 B2 * | 12/2002 | Weldon et al. | ................. | 123/520 |
| 7,047,952 B1 * | 5/2006 | Yamauchi et al. | ............ | 123/519 |
| 7,228,851 B2 * | 6/2007 | Nakamura et al. | ............ | 123/519 |
| 7,311,089 B2 * | 12/2007 | Balsdon | ........................ | 123/520 |
| 7,341,048 B2 * | 3/2008 | Koyama et al. | ................ | 123/518 |
| 7,389,769 B2 * | 6/2008 | Amano et al. | ................. | 123/520 |
| 7,845,337 B2 * | 12/2010 | Song | ............................. | 123/520 |
| 2006/0180127 A1 * | 8/2006 | Hirano et al. | ................. | 123/520 |
| 2009/0250039 A1 * | 10/2009 | Song | ............................. | 123/520 |

FOREIGN PATENT DOCUMENTS

| | | |
|---|---|---|
| JP | 1-58760 U | 4/1989 |
| JP | 1995-17951 A | 3/1995 |
| JP | 2004-316547 A | 11/2004 |
| JP | 2005-023881 A | 1/2005 |
| JP | 2007-135809 A | 12/2008 |

* cited by examiner

*Primary Examiner* — Stephen K Cronin
*Assistant Examiner* — Joseph Dallo
(74) *Attorney, Agent, or Firm* — Morgan, Lewis & Bockius LLP

(57) ABSTRACT

A canister for vehicles provided with an activated carbon to absorb an evaporation gas evaporated from a fuel tank, and releasing the absorbed evaporation gas to an engine, may include a housing to receive the activated carbon; an evaporation gas supply passage formed to the housing and fluid-connected to the fuel tank; an air passage formed to the housing and selectively receiving an air from the exterior of the housing; and a purge passage formed to the housing and fluid-connected to a purge line to supply the evaporation gas to the engine according to a flow of the received air, wherein the purge passage is provided with a first purge passage formed to the housing and directly fluid-connecting the housing to the purge line and a second purge passage formed to the housing and having an end portion positioned inside the first purge passage or the purge line.

10 Claims, 3 Drawing Sheets

CANISTER FOR VEHICLES AND FUEL SUPPLY SYSTEM PROVIDED WITH THE SAME

CROSS-REFERENCE TO RELATED APPLICATION

The present application claims priority to Korean Patent Application No. 10-2010-0094724 filed in the Korean Intellectual Property Office on Sep. 29, 2010, the entire contents of which is incorporated herein for all purposes by this reference.

BACKGROUND OF THE INVENTION

1. Field of the Invention

The present invention relates to a canister for vehicles and a fuel supply system provided with the same, and more particularly to a canister for vehicles and a fuel supply system provided with the same mounted at a hybrid vehicle and increasing purge of an evaporation gas purge.

2. Description of Related Art

The automotive industry has actively sought to reduce pollutants in exhaust gases. One method for reducing pollutants in exhaust gases is by using canister purge Generally, gasoline includes a mixture of hydrocarbons ranging from higher volatility butanes (C4) to lower volatility C8 to C10 hydrocarbons. Such gasoline is stored in a fuel tank. However, when the temperature of the surroundings is high or vapor pressure in the fuel tank is increased by movement of the vapor, fuel vapor leaks through crevices of the fuel tank. To prevent leakage of the fuel vapor, the fuel vapor is vented into a canister when the vapor pressure in the fuel tank is increased.

The canister has absorbent material (i.e., activated carbon) for absorbing the fuel vapor from the fuel tank. If the hydrocarbons HC absorbed by the canister are vented into the atmosphere, the engine does not meet exhaust gas regulations. Therefore, an engine control unit operates a purge control solenoid valve in order to vent the hydrocarbons absorbed by the canister into the engine.

Meanwhile, a hybrid vehicle is a vehicle having both an engine for generating a power by combusting a fuel and a motor for outputting a power of a battery. Recently, use of an engine becomes shortened for enhancement of fuel economy, and accordingly time for burning fuel evaporation of the canister becomes shortened. Since the fuel evaporation absorbed in the canister increases but the fuel evaporation purged from the canister decreases, overflow of the fuel evaporation may occur.

The information disclosed in this Background of the Invention section is only for enhancement of understanding of the general background of the invention and should not be taken as an acknowledgement or any form of suggestion that this information forms the prior art already known to a person skilled in the art.

BRIEF SUMMARY OF THE INVENTION

Various aspects of the present invention are directed to provide a canister for vehicles and a fuel supply system provided with the same having advantages of preventing overflow of fuel evaporation and improving fuel economy.

In an aspect of the present invention, the canister for vehicles provided with an activated carbon therein so as to absorb an evaporation gas evaporated from a fuel tank, and releasing the absorbed evaporation gas so as to supply to an engine, may include a housing to receive the activated carbon therein, an evaporation gas supply passage formed to the housing to be fluid-connected to the fuel tank and receive the evaporation gas from the fuel tank, an air passage formed to the housing and selectively receiving an air from the exterior of the housing, and a purge passage formed to the housing to be fluid-connected to a purge line so as to supply the evaporation gas to the engine according to a flow of the received air, wherein the purge passage may be provided with a first purge passage formed to the housing and directly fluid-connecting the housing to the purge line and a second purge passage formed to the housing and having an end portion positioned inside the first purge passage or the purge line so as to be fluid-connected to the purge line.

The end portion of the second purge passage extends along a flow direction of the evaporation gas passing through the first purge passage or the purge line.

The end portion of the second purge passage may be formed of a venturi, a diameter of which may be smaller than that of the other parts of the second purge passage, such that a speed of the evaporation gas passing through the second purge passage may be increased.

The first and second purge passage may be connected respectively to first and second purge holes formed respectively at different positions of the housing, and the end portion of the second purge passage penetrates a part of an exterior circumference of the first purge passage or the purge line and may be positioned in the first purge passage or the purge line.

In another aspect of the present invention, the fuel supply system may include a fuel tank connected to a refueling line so as to receive a fuel, exhausting an evaporation gas therein through an evaporation gas line, and supplying the fuel through a fuel supply line, an engine connected to the fuel supply line so as to receive the fuel from the fuel tank, and connected to an intake passage so as to receive an air, a purge line connected to the intake passage, and a canister provided with a housing to receive an activated carbon for absorbing the evaporation gas therein through the evaporation gas line, and may include an evaporation gas supply passage formed to the housing and fluid-connected to the evaporation gas line so as to receive the evaporation gas, an air passage connected to an air supply line so as to receive an air from the exterior of the housing, and a purge passage formed to the housing to be fluid-connected to the purge line, releasing the evaporation gas absorbed at the activated carbon according to a flow of the air received through the air passage, and supplying the evaporation gas to the intake passage, wherein the purge passage may be provided with a first purge passage formed to the housing to directly fluid-connect the housing to the purge line and a second purge passage formed to the housing and having an end portion positioned in the first purge passage or the purge line so as to be fluid-connected to the purge line.

The end portion of the second purge passage extends along a flow direction of the evaporation gas passing through the first purge passage or the purge line.

The end portion of the second purge passage may be formed of a venturi, a diameter of which may be smaller than that of the other parts of the second purge passage, such that a speed of the evaporation gas passing through the second purge passage may be increased.

The first and second purge passage may be connected respectively to first and second purge holes formed respectively at different positions of the housing, and the end portion of the second purge passage penetrates a part of an exterior circumference of the first purge passage or the purge line and may be positioned in the first purge passage or the purge line.

A purge control solenoid valve for selectively supplying the evaporation gas of the canister to the intake passage may be mounted at the purge line, and a drain cut valve for selectively supplying the air of the exterior of the housing may be mounted at the air supply line.

The purge control solenoid valve and the drain cut valve may be simultaneously controlled.

The methods and apparatuses of the present invention have other features and advantages which will be apparent from or are set forth in more detail in the accompanying drawings, which are incorporated herein, and the following Detailed Description of the Invention, which together serve to explain certain principles of the present invention.

Figure 1:
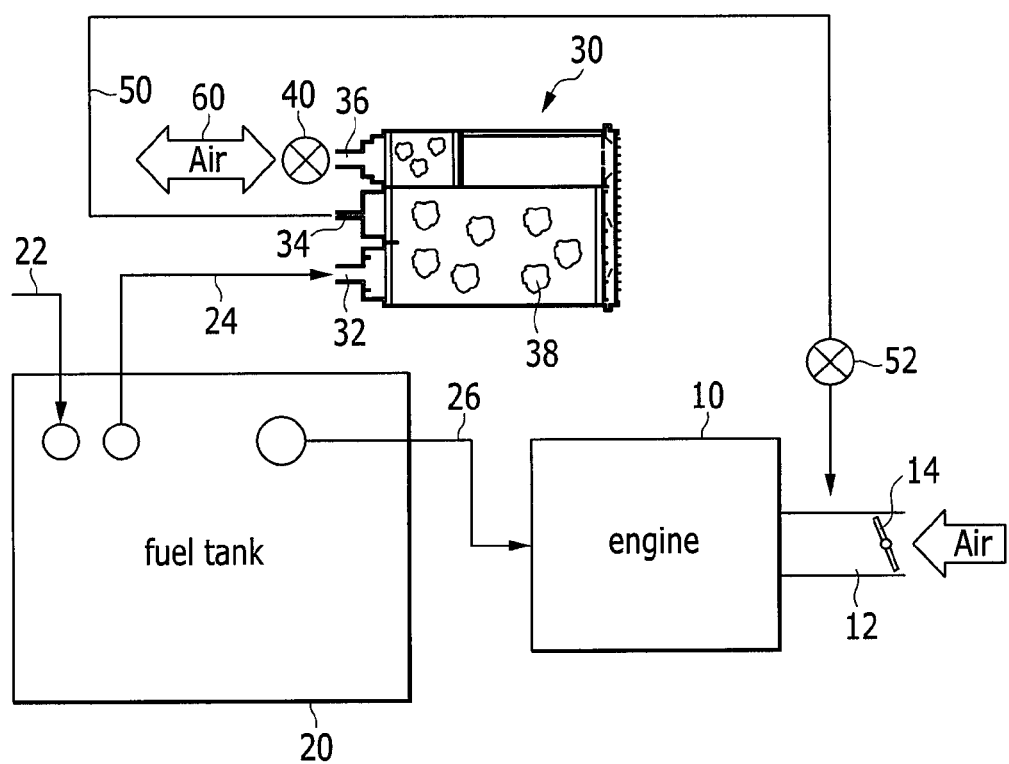
FIG. 1 is a schematic diagram of a fuel supply system according to an exemplary embodiment of the present invention.

It should be understood that the appended drawings are not necessarily to scale, presenting a somewhat simplified representation of various features illustrative of the basic principles of the invention. The specific design features of the present invention as disclosed herein, including, for example, specific dimensions, orientations, locations, and shapes will be determined in part by the particular intended application and use environment.

In the figures, reference numbers refer to the same or equivalent parts of the present invention throughout the several figures of the drawing.

DETAILED DESCRIPTION OF THE INVENTION

Reference will now be made in detail to various embodiments of the present invention(s), examples of which are illustrated in the accompanying drawings and described below. While the invention(s) will be described in conjunction with exemplary embodiments, it will be understood that present description is not intended to limit the invention(s) to those exemplary embodiments. On the contrary, the invention(s) is/are intended to cover not only the exemplary embodiments, but also various alternatives, modifications, equivalents and other embodiments, which may be included within the spirit and scope of the invention as defined by the appended claims.

An exemplary embodiment of the present invention will hereinafter be described in detail with reference to the accompanying drawings.

FIG. 1 is a schematic diagram of a fuel supply system according to an exemplary embodiment of the present invention.

As shown in FIG. 1, a fuel supply system according to an exemplary embodiment of the present invention includes an engine 10, a fuel tank 20, and a canister 30.

The engine 10 generates power for driving a vehicle by burning a fuel and an air, and includes an intake manifold for receiving the air and the fuel and an exhaust manifold for exhausting an exhaust gas generating at combustion process. The intake manifold is connected to an intake passage 12 and receives the air from the exterior. In addition, a throttle valve 14 is mounted at the intake passage 12 and controls air amount supplied to the intake manifold.

The fuel tank 20 stores the fuel and is connected to the engine 10 through a fuel supply line 26 so as to supply the fuel to the engine 10. The fuel tank 20 is connected to a refueling line 22 so as to receive the fuel. In addition, the fuel tank 20 is connected to the canister 30 through an evaporation gas line 24 so as to supply evaporation gas generated in the fuel tank 20 to the canister 30. Herein, the evaporation gas means fuel evaporation.

The canister 30 absorbs the evaporation gas of the fuel tank 20, releases the absorbed evaporation gas according to a control of a control portion, and supplies the evaporation gas to the engine 10. For this purpose, the canister 30 is provided with an activated carbon 38 therein. A plurality of micropores is formed at the activated carbon 38, and the evaporation gas is absorbed in the plurality of micropores. In addition, the canister 30 further includes an evaporation gas supply passage 32, a purge passage 34, and an air passage 36.

The evaporation gas supply passage 32 is connected to the evaporation gas line 24 and receives the evaporation gas of the fuel tank 20. The evaporation gas supplied in the canister 30 through the evaporation gas supply passage 32 is absorbed at the activated carbon 38.

The purge passage 34 is connected to a purge line 50, and the purge line 50 is connected to the intake passage 12 downstream of the throttle valve 14. The purge passage 34 selectively supplies the evaporation gas in the canister 30 to the engine 10 through the purge line 50 and the intake passage 12.

The air passage 36 is connected to an air supply line 60 and selectively receives the air of the exterior. If the air of the exterior is supplied in the canister 30 through the air passage 36, the evaporation gas absorbed at the activated carbon 38 is released by difference between negative pressure generated at the intake passage 12 downstream of the throttle valve 14 and atmospheric pressure, and the released evaporation gas is supplied to the intake passage 12 together with the air supplied to the canister 30. That is, the evaporation gas of the canister 30 is supplied to the engine 10 according to a flow of the air supplied through the air passage 36.

Meanwhile, the fuel supply system according to the exemplary embodiment of the present invention further includes a drain cut valve 40 mounted at the air supply line 60 and a purge control solenoid valve 52 mounted at the purge line 50.

The drain cut valve 40 controls the air supplied to the canister 30 through the air supply line 60, and the purge control solenoid valve 52 controls the evaporation gas supplied from the canister 30 to the intake passage 12 through the purge line 50. Such drain cut valve 40 and purge control solenoid valve 52 may be simultaneously controlled by the control portion. That is, the purge control solenoid valve 52 is open if the drain cut valve 40 is open, and the purge control solenoid valve 52 is close if the drain cut valve 40 is close.

Hereinafter, the canister 30 according to an exemplary embodiment of the present invention will be described in further detail with reference to FIG. 2 and FIG. 3. Particularly, the canister 30 according to an exemplary embodiment of the present invention is similar to a conventional canister except the purge passage 34. Therefore, the purge passage 34 will be described in detail.

Figure 2:
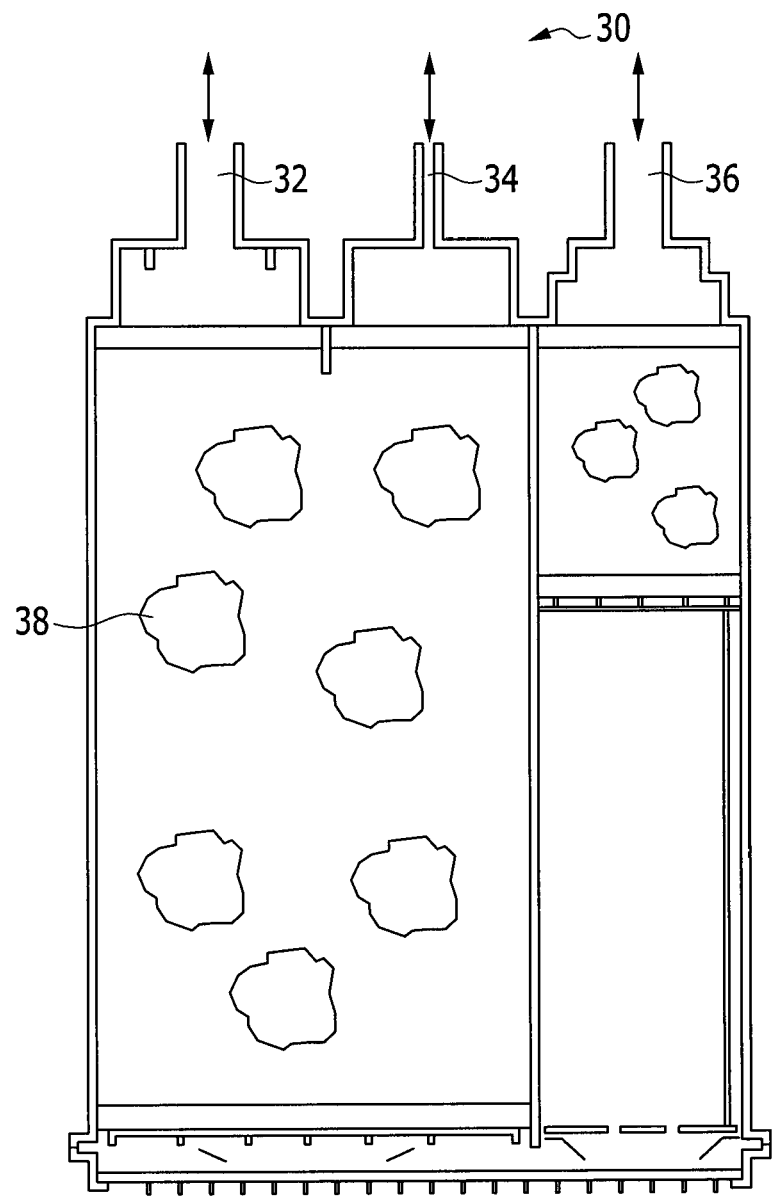
FIG. 2 is a cross-sectional view of a canister for vehicles according to an exemplary embodiment of the present invention.
Figure 3:
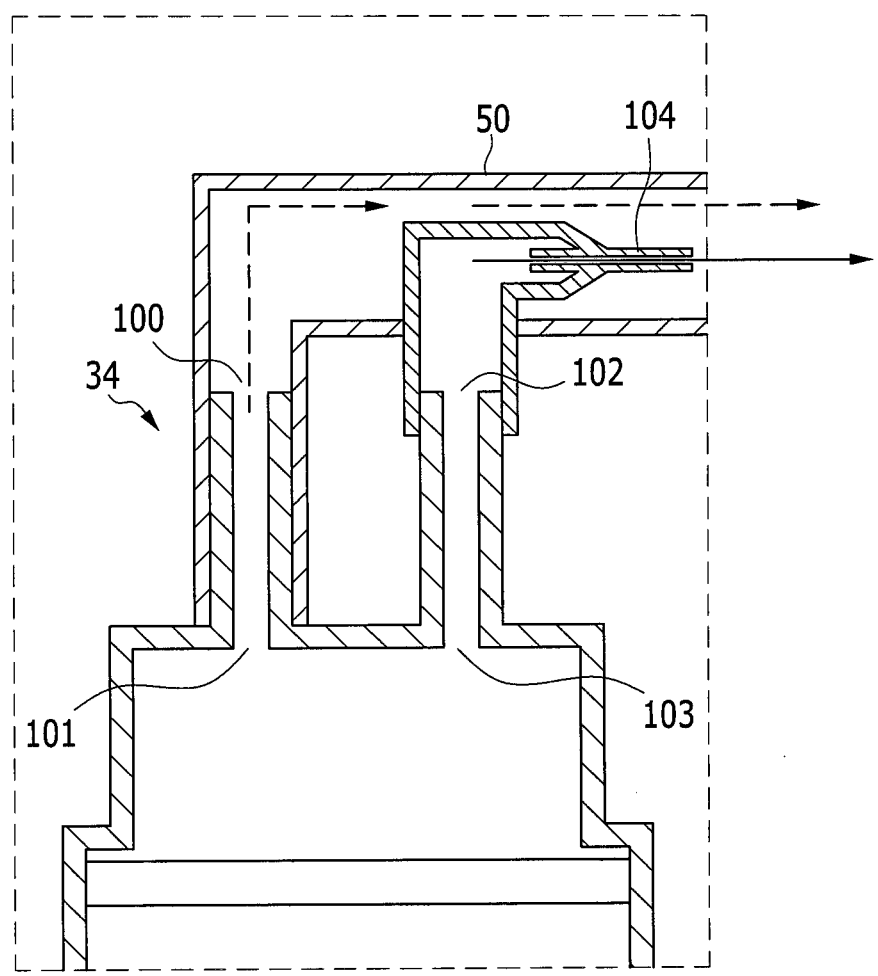
FIG. 3 is a partial enlarged view of FIG. 2.

FIG. 2 is a cross-sectional view of a canister for vehicles according to an exemplary embodiment of the present invention, and FIG. 3 is a partial enlarged view of FIG. 2.

As shown in FIG. 2 and FIG. 3, the canister 30 has a housing 45 provided with a first purge hole 101 and a second purge hole 103 formed respectively at different positions of the housing 45. Therefore, the evaporation gas of the canister 30 flows out through the first purge hole 101 and the second purge hole 103. In addition, the purge passage 34 of the canister 30 includes a first purge passage 100 and a second purge passage 102. The first purge passage 100 is connected to the first purge hole 101 and the second purge passage 102 is connected to the second purge hole 103. The first purge passage 100 and the second purge passage 102 are connected to each other at the purge line 50. Concretely, the first purge passage 100 is directly connected to the purge line 50 (i.e., an end of the first purge passage 100 is connected to an end of the purge line 50). The second purge passage 102 penetrates a part of an exterior circumference of the first purge passage 100 or the purge line 50 and an end of the second purge passage 102 is positioned in the first purge passage 100 or the purge line 50.

In addition, the end portion 104 of the second purge passage 102 extends along a flow of the evaporation gas passing through the first purge passage 100 or the purge line 50. That is, the end portion 104 of the second purge passage 102 is formed to the same direction of the first purge passage 100 or the purge line 50. Further, the second purge passage 102 is formed of a venturi. That is, a diameter of the end portion 104 of the second purge passage 102 is smaller than that of the other parts of the second purge passage 102. Accordingly, a speed of the evaporation gas passing through the second purge passage 102 and flowing out to the first purge passage 100 or the purge line 50 increases. In addition, since the speed of the evaporation gas passing through the second purge passage 102 increases, a pressure near the second purge passage 102 in the first purge passage 100 or the purge line 50 is lowered (Beroulli's theorem). Therefore, a flow rate of the evaporation gas passing through the first purge passage 100 increases.

Since a purge amount of the canister 30 is increased under the same purge condition, overflow of the evaporation gas may be prevented.

In addition, since the activated carbon is not heated but the purge passage is added, manufacturing cost may increase a little.

Meanwhile, it is exemplified in an exemplary embodiment of the present invention that the first and second purge holes 101 and 103 are formed at the different positions, but the scope of the present invention is not limited to this. That is, the second purge hole 103 having smaller diameter may be formed in the first purge hole 101 (by attaching a part of an exterior circumference of the first purge hole 101 with a part of an exterior circumference of the second purge hole 103). In this case, the second purge passage 102 is disposed in the first purge passage 100 and the second purge passage 102 is formed of the venturi.

As described above, since the second purge passage formed of the venture is disposed in the first purge passage and the purge amount of the canister increases according to an exemplary embodiment of the present invention, the overflow of the evaporation gas may be prevented.

In addition, since the engine is not operated or the activated carbon is not heated for preventing the overflow of the evaporation gas, fuel economy may improve.

Further, since additional devices for preventing the overflow of the evaporation gas, manufacturing cost may not be increased.

For convenience in explanation and accurate definition in the appended claims, the terms "upper", "lower", "inner" and "outer" are used to describe features of the exemplary embodiments with reference to the positions of such features as displayed in the figures.

The foregoing descriptions of specific exemplary embodiments of the present invention have been presented for purposes of illustration and description. They are not intended to be exhaustive or to limit the invention to the precise forms disclosed, and obviously many modifications and variations are possible in light of the above teachings. The exemplary embodiments were chosen and described in order to explain certain principles of the invention and their practical application, to thereby enable others skilled in the art to make and utilize various exemplary embodiments of the present invention, as well as various alternatives and modifications thereof. It is intended that the scope of the invention be defined by the Claims appended hereto and their equivalents.

What is claimed is:

1. A canister for vehicles provided with an activated carbon therein so as to absorb an evaporation gas evaporated from a fuel tank, and releasing the absorbed evaporation gas so as to supply to an engine, the canister comprising:
   a housing to receive the activated carbon therein;
   an evaporation gas supply passage formed to the housing to be fluid-connected to the fuel tank and receive the evaporation gas from the fuel tank;
   an air passage formed to the housing and selectively receiving an air from the exterior of the housing; and
   a purge passage formed to the housing to be fluid-connected to a purge line so as to supply the evaporation gas to the engine according to a flow of the received air,
   wherein the purge passage is provided with a first purge passage formed to the housing and directly fluid-connecting the housing to the purge line and a second purge passage formed to the housing and having an end portion positioned inside the first purge passage or the purge line so as to be fluid-connected to the purge line.

2. The canister of claim 1, wherein the end portion of the second purge passage extends along a flow direction of the evaporation gas passing through the first purge passage or the purge line.

3. The canister of claim 2, wherein the end portion of the second purge passage is formed of a venturi, a diameter of which is smaller than that of the other parts of the second purge passage, such that a speed of the evaporation gas passing through the second purge passage is increased.

4. The canister of claim 3, wherein the first and second purge passage are connected respectively to first and second purge holes formed respectively at different positions of the housing, and the end portion of the second purge passage penetrates a part of an exterior circumference of the first purge passage or the purge line and is positioned in the first purge passage or the purge line.

5. A fuel supply system comprising:
   a fuel tank connected to a refueling line so as to receive a fuel, exhausting an evaporation gas therein through an evaporation gas line, and supplying the fuel through a fuel supply line;
   an engine connected to the fuel supply line so as to receive the fuel from the fuel tank, and connected to an intake passage so as to receive an air;
   a purge line connected to the intake passage; and
   a canister provided with a housing to receive an activated carbon for absorbing the evaporation gas therein through the evaporation gas line, and comprises:
      an evaporation gas supply passage formed to the housing and fluid-connected to the evaporation gas line so as to receive the evaporation gas;
      an air passage connected to an air supply line so as to receive an air from the exterior of the housing; and
      a purge passage formed to the housing to be fluid-connected to the purge line, releasing the evaporation gas absorbed at the activated carbon according to a flow of the air received through the air passage, and supplying the evaporation gas to the intake passage, wherein the purge passage is provided with a first purge passage formed to the housing to directly fluid-connect the housing to the purge line and a second purge passage formed to the housing and having an end portion positioned in the first purge passage or the purge line so as to be fluid-connected to the purge line.

6. The fuel supply system of claim 5, wherein the end portion of the second purge passage extends along a flow direction of the evaporation gas passing through the first purge passage or the purge line.

7. The fuel supply system of claim 6, wherein the end portion of the second purge passage is formed of a venturi, a diameter of which is smaller than that of the other parts of the second purge passage, such that a speed of the evaporation gas passing through the second purge passage is increased.

8. The fuel supply system of claim 7, wherein the first and second purge passage are connected respectively to first and second purge holes formed respectively at different positions of the housing, and the end portion of the second purge passage penetrates a part of an exterior circumference of the first purge passage or the purge line and is positioned in the first purge passage or the purge line.

9. The fuel supply system of claim 5, wherein a purge control solenoid valve for selectively supplying the evaporation gas of the canister to the intake passage is mounted at the purge line, and a drain cut valve for selectively supplying the air of the exterior of the housing is mounted at the air supply line.

10. The fuel supply system of claim 9, wherein the purge control solenoid valve and the drain cut valve are simultaneously controlled.

\* \* \* \* \*